(12) United States Patent
Uratani et al.

(10) Patent No.: US 9,476,797 B2
(45) Date of Patent: Oct. 25, 2016

(54) INTERNAL COMBUSTION ENGINE TEST SYSTEM AND COMPUTER PROGRAM

(71) Applicant: HORIBA, Ltd., Kyoto (JP)

(72) Inventors: Katsumi Uratani, Kyoto (JP); Tsutomu Misogi, Kyoto (JP); Tetsu Yoshioka, Kyoto (JP)

(73) Assignee: Horiba, Ltd., Kyoto (JP)

( * ) Notice: Subject to any disclaimer, the term of this patent is extended or adjusted under 35 U.S.C. 154(b) by 0 days.

(21) Appl. No.: 14/203,833

(22) Filed: Mar. 11, 2014

(65) Prior Publication Data

US 2014/0250992 A1 Sep. 11, 2014

(30) Foreign Application Priority Data

Mar. 11, 2013 (JP) .................................. 2013-048342

(51) Int. Cl.
*G01M 15/10* (2006.01)
*G05B 23/02* (2006.01)

(52) U.S. Cl.
CPC ........... *G01M 15/102* (2013.01); *G01M 15/10* (2013.01); *G05B 23/0272* (2013.01)

(58) Field of Classification Search
CPC .. G01M 15/102; G01M 15/10; G01M 17/00; G01M 17/007; G01M 17/0072; G01N 1/2252; G01N 1/24; G06F 3/0482
USPC ...................................................... 73/114.71
See application file for complete search history.

(56) References Cited

U.S. PATENT DOCUMENTS

| | | | | | |
|---|---|---|---|---|---|
| 5,639,957 | A | * | 6/1997 | Zarchy ................ | G01M 15/102 73/114.69 |
| 5,846,831 | A | * | 12/1998 | Silvis .................... | G01N 1/2252 422/62 |
| 6,308,130 | B1 | * | 10/2001 | Vojtisek-Lom ....... | G01M 15/10 701/114 |
| 6,516,656 | B1 | * | 2/2003 | Jetter ................... | G01M 15/102 73/114.71 |
| 6,623,975 | B1 | * | 9/2003 | Tefft .................... | G01M 15/102 436/127 |
| 7,071,002 | B1 | * | 7/2006 | Tefft .................... | G01M 15/102 422/83 |
| 7,277,801 | B2 | * | 10/2007 | Webb ................. | B01D 53/9495 702/184 |
| 7,625,201 | B2 | * | 12/2009 | Ingalls, Jr. ......... | B01D 53/9495 431/10 |

(Continued)

FOREIGN PATENT DOCUMENTS

| | | |
|---|---|---|
| JP | 2005-049353 | 2/2005 |
| JP | 2005049353 A * | 2/2005 |
| WO | 2012-121169 A1 | 9/2012 |

OTHER PUBLICATIONS

National Instruments, In-Depth Solutions with Graphical System Design in Eastern Europe, May 30, 2012, 144 pgs.

*Primary Examiner* — Freddie Kirkland, III
(74) *Attorney, Agent, or Firm* — Brooks Kushman P.C.

(57) ABSTRACT

It is intended to display a schematic diagram of substantially the whole of an internal combustion engine test system on a screen and a color, brightness, pattern or shape of a symbol representing a test device shown in the schematic diagram are changed according to a degree of operation safety of the test device, whereby a user is allowed to intuitively recognize a situation relating to the safety of the entire system at a glance.

9 Claims, 8 Drawing Sheets

(56) References Cited

U.S. PATENT DOCUMENTS

| | | | |
|---|---|---|---|
| 8,429,957 B2* | 4/2013 | Stedman | G01M 15/108 73/114.71 |
| 8,868,280 B2* | 10/2014 | Uratani | G01M 15/10 701/29.1 |
| 8,996,231 B2* | 3/2015 | Uratani | G01M 17/00 701/29.1 |
| 9,116,138 B2* | 8/2015 | Okada | G01N 33/0063 |
| 2004/0007056 A1* | 1/2004 | Webb | B01D 53/9495 73/114.77 |
| 2006/0201239 A1* | 9/2006 | Webb | B01D 53/9495 73/114.75 |
| 2011/0169836 A1* | 7/2011 | Orihashi | G01N 35/00722 345/440 |
| 2013/0325248 A1* | 12/2013 | Uratani | G01M 17/00 701/31.4 |
| 2013/0339892 A1 | 12/2013 | Watanabe et al. | |

\* cited by examiner

INTERNAL COMBUSTION ENGINE TEST SYSTEM AND COMPUTER PROGRAM

CROSS-REFERENCE TO RELATED APPLICATION

This application claims priority to JP Application No. 2013-048342, filed Mar. 11, 2013, the disclosure of which is incorporated in its entirety by reference herein.

TECHNICAL FIELD

The present invention relates to an internal combustion engine test system for performing an exhaust gas test of an internal combustion engine etc.

BACKGROUND

Recently, a test system for an internal combustion engine has become increasingly complicated. For example, although test contents for a diesel engine are different from those for a gasoline engine, there has been developed a test system compatible for measuring both of the diesel engine and gasoline engine.

By the way, in the case of adopting such a large-scale test system, the number of test devices such as exhaust gas lines for the sampled exhaust gas to flow, switching valves or measurement equipment is also increased. Therefore, an operation error is likely caused by a user, and as a result, it becomes necessary to redo the test, and further this may even cause a damage of the test device or the internal combustion engine.

For example, in the case where an operation error has been done such that an internal combustion engine is driven without activating a blower for sucking exhaust gas, there may likely be a case where a filter of a dilution gas introduction pipe for diluting the exhaust gas may likely be burned.

Further, for the time of performing a flow rate verification of a blower or correcting a flow rate measurement value of dilution gas and the like, a shut-off valve is provided in the exhaust gas line for preventing the exhaust gas from flowing. In this configuration, if an internal combustion engine is operated while the shut-off valve remains closed, i.e., in a state that the exhaust gas does not flow in the exhaust gas line, there may likely be a case where the exhaust gas may flow back to the internal combustion engine, which may damage the internal combustion engine.

Alternatively, a sample bag is provided as a test device for sampling and batch-analyzing the exhaust gas. In this configuration, if gas is excessively fed in this bag, there may be a case where the bag is damaged. Since the PM collection filter is clogged in the case of collecting more than a certain amount of PM, it is necessary to clean or replace the PM collection filter.

SUMMARY

Technical Problem

In the conventional configuration, however, for example, the operating condition of each of the test devices is to be individually displayed as numerical information or character information. Therefore, the operating condition of the whole system cannot be recognized at a glance. In particular, when the system is complicated, it is hard to say that an operation error such as operating the internal combustion engine while the shut-off valve remains closed as mentioned above can be sufficiently prevented.

Further, as in the conventional case, even if the operating condition is individually shown as numeric values or characters for every test device, since it is hard to recognize a relationship with respect to the other test devices, when there occurs an abnormality, for example, in one test device, there is also a problem that it is difficult to specify another test device which becomes a cause of the abnormality or specify another test device to be possibly affected by the operation abnormality of the outstanding test device.

Therefore, the present invention has been made in consideration of such problems and its essential object is to provide a more user-friendly internal combustion engine test system for a user to be able to intuitively recognize an operating condition at a glance particularly relating to safety of the whole internal combustion engine test system, whereby an operation error at a time of testing the internal combustion engine can be reduced as much as possible even in a case of a complicated and large-scale system.

Solution to Problem

That is, an internal combustion engine test system according to the present invention is equipped with a plurality of test devices including an exhaust gas line for sampling exhaust gas discharged from an internal combustion engine, and the system includes: a system status display part adapted to display a schematic diagram of substantially the whole of the internal combustion engine test system including a symbol representing each of the test devices on a screen; and an operating condition acquisition part adapted to acquire an operating condition of each of the test devices, wherein the system status display part displays information relating to at least operation safety among an operating condition in a unit of the test device acquired by the operating condition acquisition part or operating conditions of combinations of the plurality of test devices by aspects of the symbols representing the test devices.

Here, the information relating to the operation safety means information relating to abnormality including a malfunction such as affecting a danger to a measurer or an internal combustion engine at a time of measurement of the exhaust gas.

As a specific aspect of the system status display part, there can be exemplified one that determines a degree of operation safety from the operating condition in a unit of the test device acquired by the operating condition acquisition part or operating conditions of combinations of the plurality of test devices and the system status display part determines an aspect of a symbol representing the test device based on the degree of the operation safety.

In order to more legibly display the information relating to the operation safety, it is preferable that the system status display part changes a color, brightness, pattern or shape of the symbol representing each of the test devices shown in the schematic diagram in accordance with the degree of operation safety.

In order to avoid an operation error of feeding excessive gas into the sampling bag which is one of the test devices, it is preferable that the system status display part determines the degree of operation safety from a gas filling degree that indicates an operating condition of the sampling bag and changes the color, brightness, pattern or shape of the symbol representing the sample bag shown in the schematic diagram based on the degree of operation safety.

In order to avoid clogging of the PM collection filter which is one of the test devices, it is preferable that the system status display part determines the degree of operation safety from a clogging degree that indicates an operating condition of the PM collection filter and changes the color, brightness, pattern or shape of the symbol representing the PM collection filter shown in the schematic diagram based on the degree of operation safety.

In order to prevent the exhaust gas from reversely flowing into the internal combustion engine due to an operation error of a shut-off valve provided on the exhaust gas line, it is preferable that the system status display part determines the degree of operation safety from a valve opening/closing status that indicates an operating condition of the shut-off valve and an operating condition of the internal combustion engine and changes the color, brightness, pattern or shape of the symbol representing at least the shut-off valve or the exhaust gas line connected thereto shown in the schematic diagram based on the degree of operation safety.

In order to prevent damages or the like of the PM collection filter due to an operation error of the blower for suction provided at the end of the exhaust gas line, it is preferable that the system status display part determines the degree of operation safety from an on/off status that indicates an operating condition of the blower and an operating condition of the internal combustion engine and changes the color, brightness, pattern or shape of the symbol representing at least the blower or the exhaust gas line connected thereto shown in the schematic diagram based on the degree of operation safety.

In order to prevent an operation error of a dynamometer which is one of the test devices, it is preferable that the system status display part determines the degree of operation safety from an on/off status that indicates an operating condition of the dynamometer and an operating condition of the internal combustion engine and changes the color, brightness, pattern or shape of the symbol representing at least the dynamometer shown in the schematic diagram based on the degree of operation safety.

Advantageous Effects of Invention

According to the present invention configured as described above, since the operating condition of the entire test system including the information relating to the operation safety is visually and dynamically expressed by the aspects of the symbols of the test devices represented in the schematic diagram and a user can intuitively recognize this at a glance, a management at a time of testing an internal combustion engine is facilitated and, as a result of this, it becomes possible to reduce operation errors as much as possible.

Moreover, since the degree of operation safety is included as an index of a symbol change of the test device, in the case where there is an abnormality, this abnormality can be immediately recognized. Further, since the whole system is displayed in the schematic diagram, it becomes possible to easily perform specification and the like of the other test device relating to the abnormality.

DESCRIPTION OF EMBODIMENTS

The following describes one embodiment of the present invention with reference to the accompanying drawings.

An internal combustion engine test system according to the present embodiment is configured of multiple test devices and is intended to test performance of the internal combustion engine by analyzing its exhaust gas.

As is known in the art, the test devices include: a chassis dynamometer (engine dynamo when testing a unit of internal combustion engine) on which a vehicle is mounted; an exhaust gas line connected to an exhaust pipe of the vehicle for sampling exhaust gas discharged from the exhaust pipe; a dilution air generator for feeding dilution air into the exhaust gas line; various measurement devices for acquiring and analyzing the exhaust gas from the exhaust gas line; a blower for suction connected to an end of the exhaust gas line; a fan for cooling the internal combustion engine of the vehicle, and the like.

Figure 10:
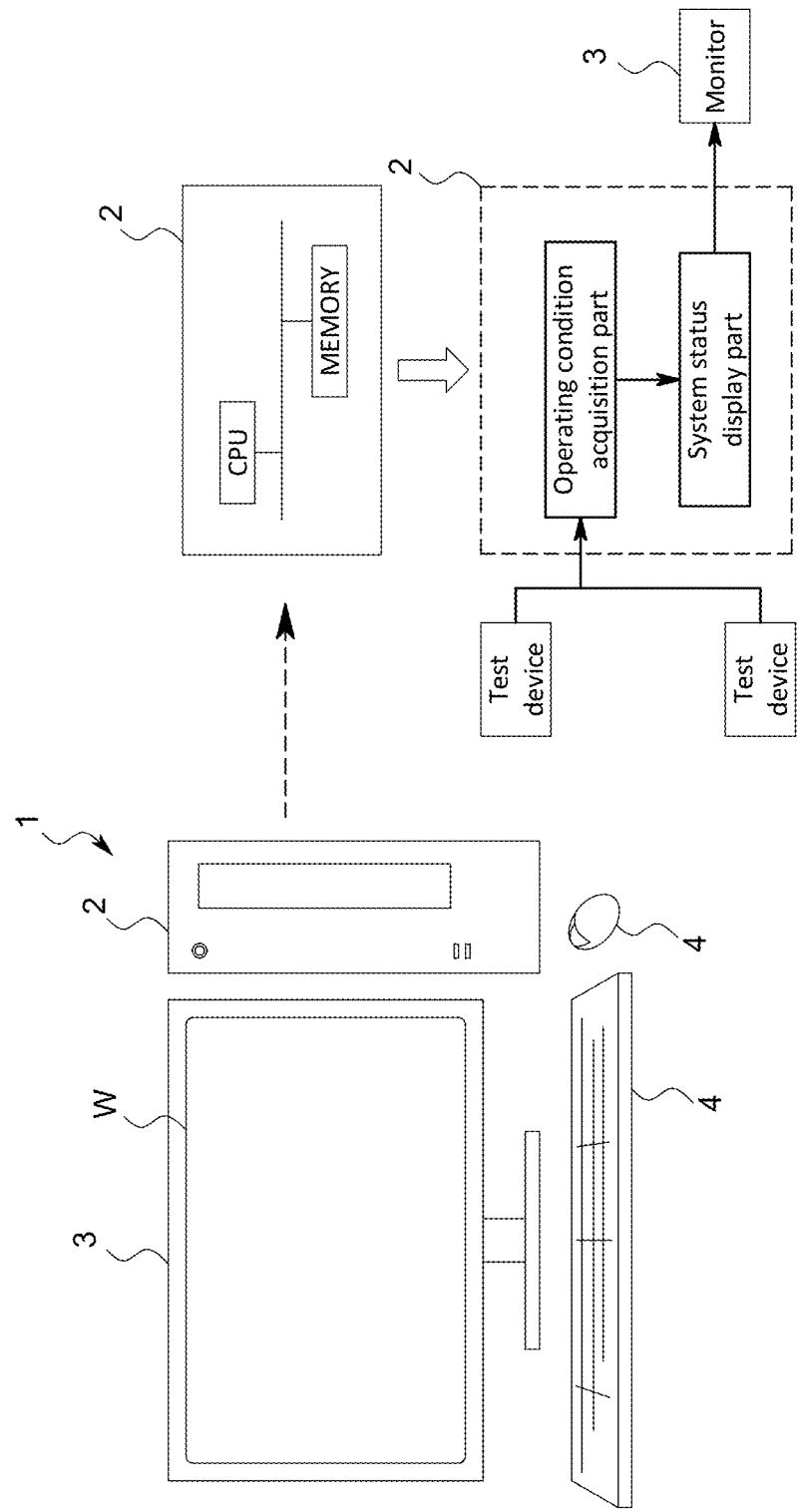
FIG. 10 is a schematic diagram showing a physical and functional configuration of a management device.

Each test device, as shown in FIG. 10, is managed by a management device 1 which includes a computer main body 2, monitor 3, input means 4 and the like, and it is configured to be able to test the internal combustion engine by operating this management device 1 by an operator.

Figure 1:
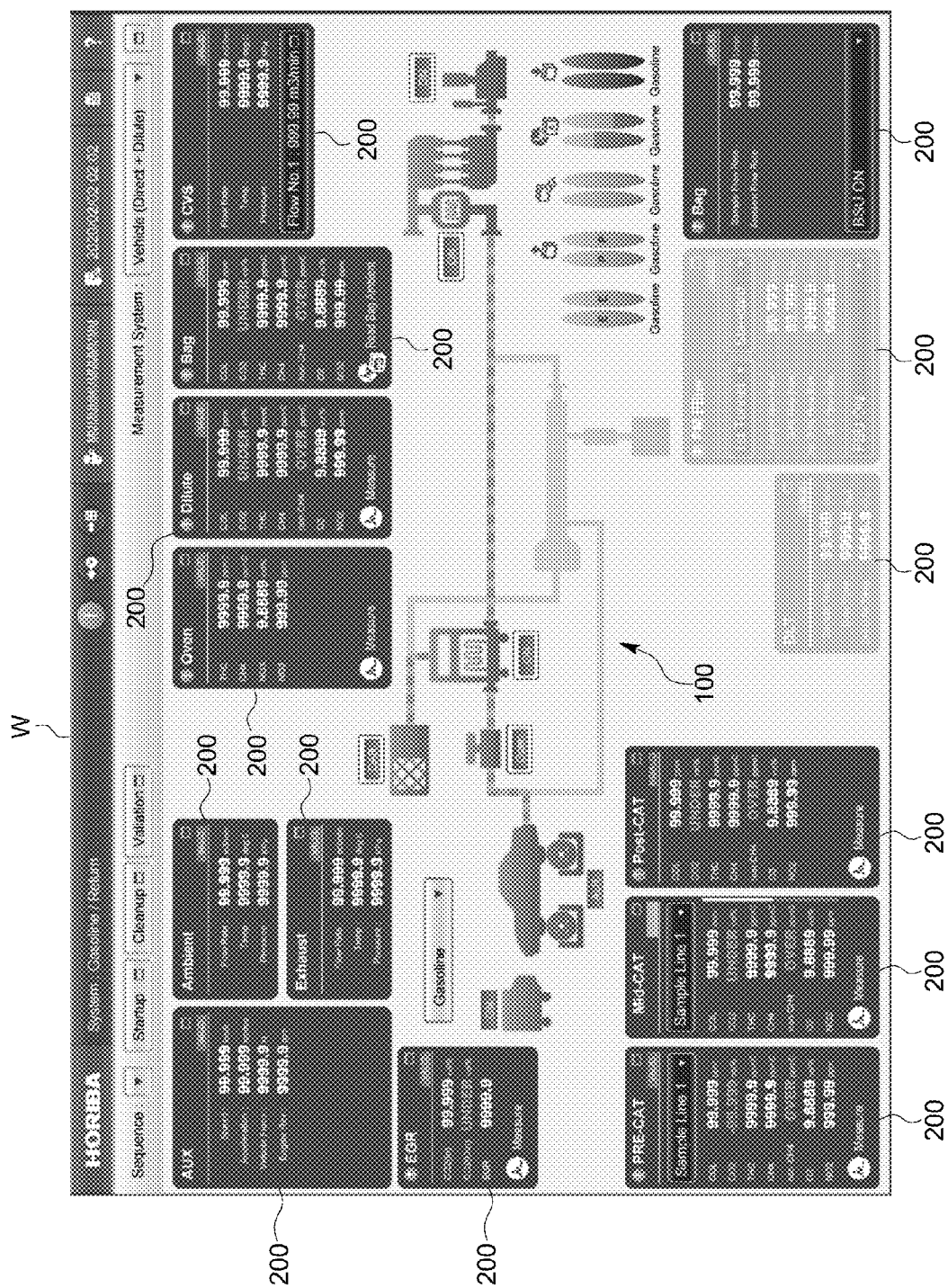
FIG. 1 is a screen illustration diagram showing a screen represented on a monitor of an internal combustion engine test system according to one embodiment of the present invention.

By the way, as shown in FIG. 1, this management device 1 is equipped with a system status display part for simultaneously displaying a schematic diagram 100 of substantially the whole of the test system which schematically represents the test devices and a connecting aspect thereof on one screen W of the monitor. It is noted that the system status display part and an operating condition acquisition part to be described later are function parts functioning upon operation of a central processing unit (CPU) provided with the computer main body 2 and peripheral equipment thereof, as shown in FIG. 10, in accordance with a program stored in a memory.

In this schematic diagram 100, a connection aspect of main test devices relating to safety of the test is displayed with symbols. Further, in the circumference of the schematic diagram 100 on this screen W, numerical information blocks 200 are simultaneously displayed for displaying information relating to an operation and measurement results of each test device with numerical values.

By the way, it is not necessary that all of the test devices displayed by the numerical information blocks 200 are symbolized in the schematic diagram 100 and vice versa, i.e., it is not necessary that all of the test devices symbolized in the schematic diagram 100 are displayed by the numerical information blocks 200. In this embodiment, symbols of the test devices especially highly relating to safety of a test operation are displayed in the schematic diagram 100 to thereby allow an operator to intuitively recognize the operating condition of the whole system at a glance. As an example of the test devices which are not displayed in the schematic diagram 100 but displayed in the numerical information blocks 200, there can be exemplified such as an integrated analytical device (displayed as PRE-CAT, Mid-CAT or Post-CAT among the numerical information blocks 200 in FIG. 1) for measuring, e.g., CO, CO2, THC, CH4, NO2 and the like in the exhaust gas and an EGR measurement device (displayed as EGR among the numerical information blocks in FIG. 1). Of course, these devices can be also included in the schematic diagram 100.

Further, each test device is registered in this management device 1 and it is configured to be switchable between a state (plug-in state) in which the management device 1 is managing the registered test device and a state (plug-out state) in which the management device is not managing the registered test device in an initialization or middle setting, and this switchable function is referred to as a plug-in/plug-out function by the present inventors. This configuration is intended to improve usage flexibility of the system and the like.

Here, in the schematic diagram 100, while the symbol of the test device plugged out becomes gray without disappearing, the numerical information block corresponding thereto is erased. Further, the numerical information block relating to the test device which is plugged in but not operated becomes light gray. Thus, a measurer can recognize a test device in a plugged-in state at a glance, and it is possible to avoid a risk in physically inserting and removing the test device (such as, for example, pulling-out the test device during usage in the test).

Figure 2:
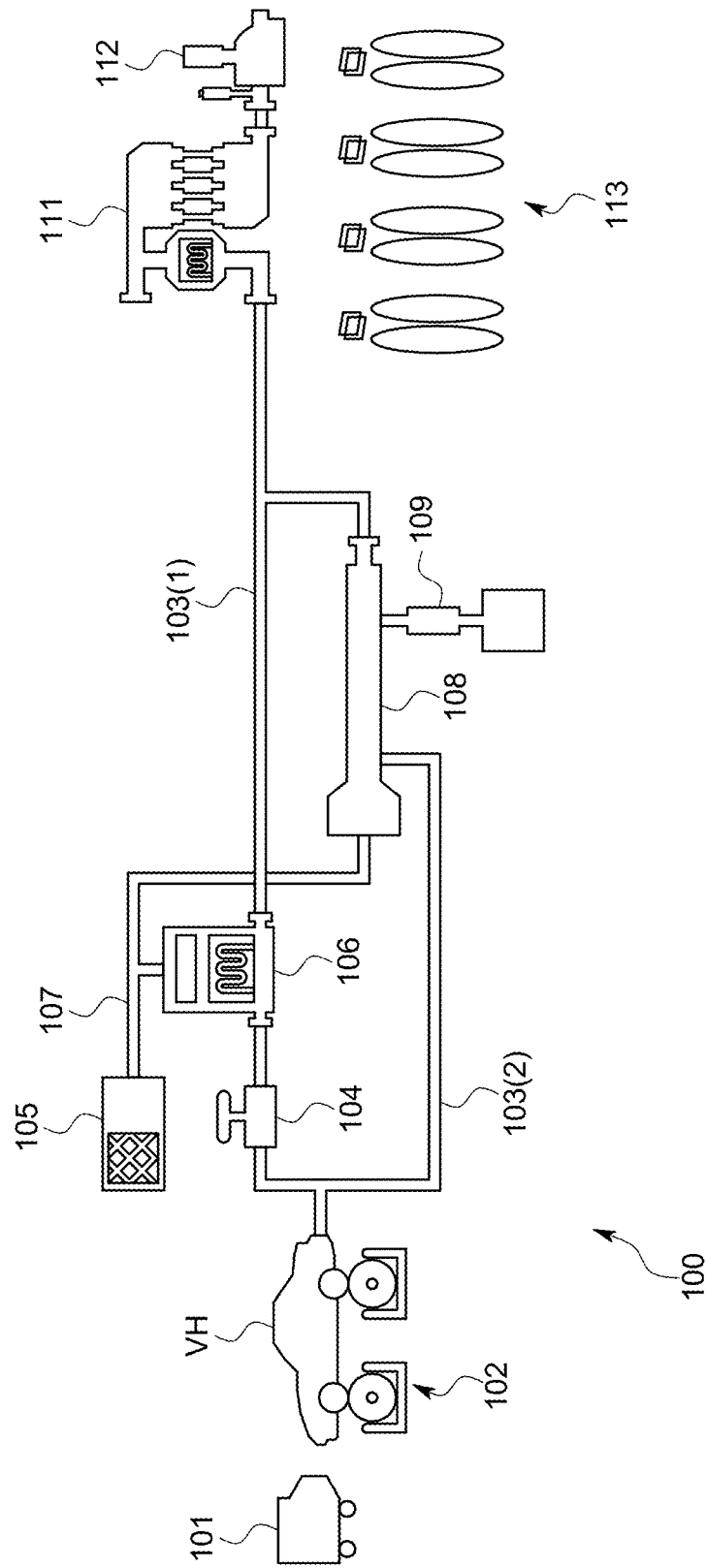
FIG. 2 is an exemplified illustration of a schematic diagram in the same embodiment.

Next, the following describes the schematic diagram 100 with reference to FIG. 2.

A symbol indicated by reference numeral 101 represents a fan for feeding a wind to a radiator, a symbol indicated by reference numeral 102 represents a chassis dynamometer, a symbol indicated by reference numeral 103 represents an exhaust gas line through which sampled exhaust gas flows, a symbol indicated by reference numeral 104 represents a shut-off valve, a symbol indicated by reference numeral 105 represents a dilution air purifier, a symbol indicated by reference numeral 107 represents a dilution air line through which dilution air generated by the dilution air purifier flows, a symbol indicated by reference numeral 106 represents a mixer with a heater for mixing the dilution air with the exhaust gas, a symbol indicated by reference numeral 108 represents a dilution tunnel, a symbol indicated by reference numeral 109 represents a PM collection filter with a pump, a symbol indicated by reference numeral 111 represents a constant flow rate venture mechanism with a heat exchanger, a symbol indicated by reference numeral 112 represents a blower, and a symbol indicated by reference numeral 113 represents a constant flow rate sample bag for batch-analyzing the exhaust gas components.

As is apparent from FIG. 2, in this internal combustion test system, it is adapted that, the exhaust gas line connected to the exhaust pipe is divided into two routes in the middle. One of the routes (which is indicated by reference numeral 103(1) in FIG. 2) leads to the venturi mechanism and blower through the shut-off valve and heater and the other of the routes (which is indicated by reference numeral 103(2) in FIG. 2) leads to the constant flow rate venture mechanism and blower through the dilution tunnel.

One route is intended to be mainly used when testing a gasoline engine and the other route is intended to be mainly used when testing a diesel engine. These routes are adapted such that any one of the routes can be selected by respective valves (not shown). That is, this internal combustion engine test system is configured to compatibly deal with both of the diesel engine and gasoline engine.

In this embodiment, each of the symbols 101 to 113 represented in the schematic diagram 100 is adapted that the color, brightness, pattern, shape and the like thereof are changed stepwise in accordance with an operating condition of the corresponding test device. This operating condition is acquired by an operating condition acquisition part included in the management device from a sensor attached to the rest device or a value of a command signal emitted to the test device or the like.

Moreover, in the present embodiment, the system status display part is intended to determine a degree of operation safety of the test device or a test device associated thereto from the operating condition of the test device. Specifically, when it becomes an operating condition that may cause a breakage of the test device, affect a danger to the measurer, or interruption or redoing of the test becomes necessary, the system status display part determines that the degree of operation safety becomes equal to or smaller than a predetermined value, and then the color, brightness, pattern, shape or the like of the symbol of the test device corresponding to that shown in the schematic diagram 100 are changed from a normal aspect free from an obstruction for the operation safety to an aspect for an operator to draw attention at a glance.

Next, the changing aspects mentioned above will be described in detail for every test device.

The exhaust gas line includes two routes as described above, and while the symbol 103 of the exhaust gas line of an active route into which the exhaust gas flows is displayed, for example, in blue, the symbol 103 of the other inactive exhaust gas line becomes, for example, thin gray. Further, in the case where the blower is operating, the symbol 103 of the active exhaust gas line becomes a blinking striped pattern remaining in blue. In FIG. 1, since the exhaust gas line of one route is active and the blower is operating, the symbol 103(1) thereof becomes a blinking striped pattern remaining in blue.

It is noted hereinafter that, when referring to "active", this shows the plug-in state under operation, and when referring to "inactive", this shows a non-operating state or the plug-out state.

Figure 3:
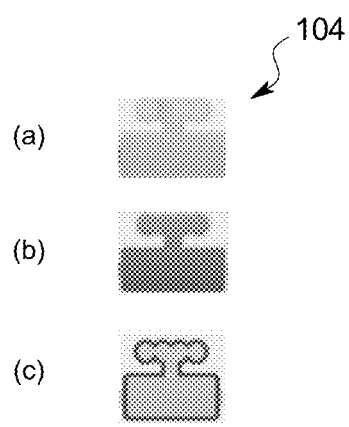
FIG. 3 is an exemplified illustration representing a change of a symbol of a shut-off valve in the same embodiment.

The shut-off valve is provided on the exhaust gas line of one route, and by flowing dilution air from the dilution air purifier in a state of closing the shut-off valve, it is allowed to compare whether or not the flow rate of the dilution air is equal to a flow rate of the constant flow rate venturi mechanism. Thus, the shut-off valve is intended to be used for flow rate calibration of the constant flow rate venturi mechanism. For example, in the active and opened state of the shut-off valve, the symbol 104 thereof becomes blue as shown in FIG. 3(b), and in the active and closed state of the shut-off valve, the symbol 104 thereof becomes gray with its periphery surrounded by a red line as shown in FIG. 3(c). In the inactive state of the shut-off valve, the symbol 104 thereof becomes gray as shown in FIG. 3(a).

Figure 4:
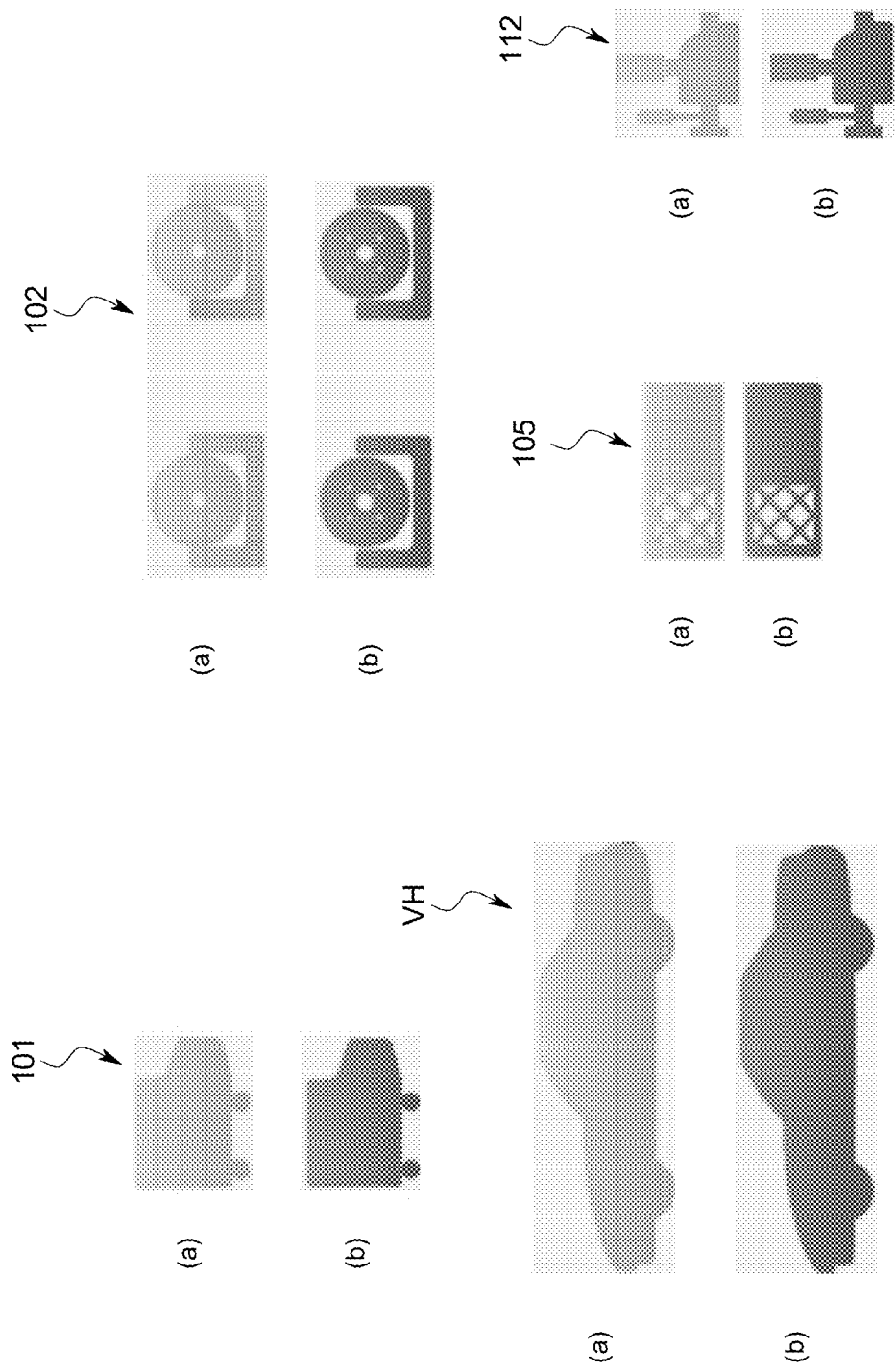
FIG. 4 is an exemplified illustration representing a change of each of symbols of a fan, vehicle, chassis dynamometer, dilution air purifier and blower in the same embodiment.

Regarding the fan, vehicle (or internal combustion engine), chassis dynamometer (or engine dynamometer), dilution air purifier and blower, the symbols thereof become, for example, blue as shown in FIG. 4(b) in the active state, and the symbols thereof become, for example, thin gray as shown in FIG. 4(a) in the inactive state.

Figure 5:
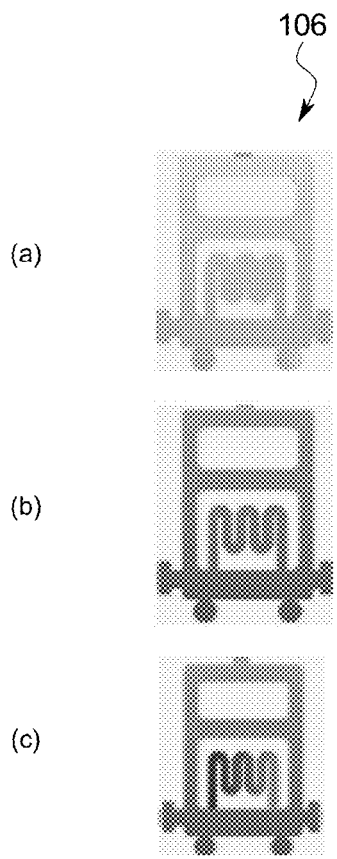
FIG. 5 is an exemplified illustration representing a change of a symbol of a mixer with a heater in the same embodiment.

Regarding the mixer with a heater, in the case where the mixer is in the inactive state or the exhaust gas line to which the mixer belongs is not selected, the symbol 106 thereof becomes gray as shown in FIG. 5(a). In the case where the mixer is in the active state and the exhaust gas line (indicated by Symbol 103(1)) to which the mixer belongs is selected, when the heater is in the OFF state, the symbol 106 thereof entirely becomes blue as shown in FIG. 5(b), and when the heater is in the ON state, only the heater portion of the symbol 106 becomes red and the remainder becomes blue as shown in FIG. 5(c).

Figure 6:
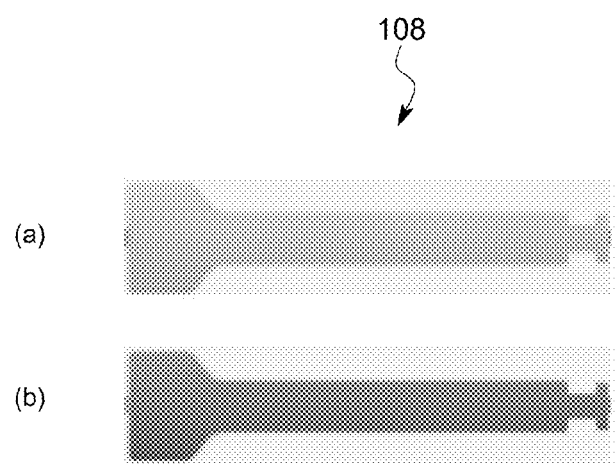
FIG. 6 is an exemplified illustration representing a change of a symbol of a dilution tunnel in the same embodiment.

Regarding the dilution tunnel, in the case where the dilution tunnel is in the inactive state or the exhaust gas line to which the dilution tunnel belongs is not selected, the symbol 108 thereof becomes gray as shown in FIG. 6(a). In the case where the dilution tunnel is in the active state and the exhaust gas line to which the dilution tunnel belongs is selected, the symbol 108 thereof becomes blue as shown in FIG. 6(b).

Figure 7:
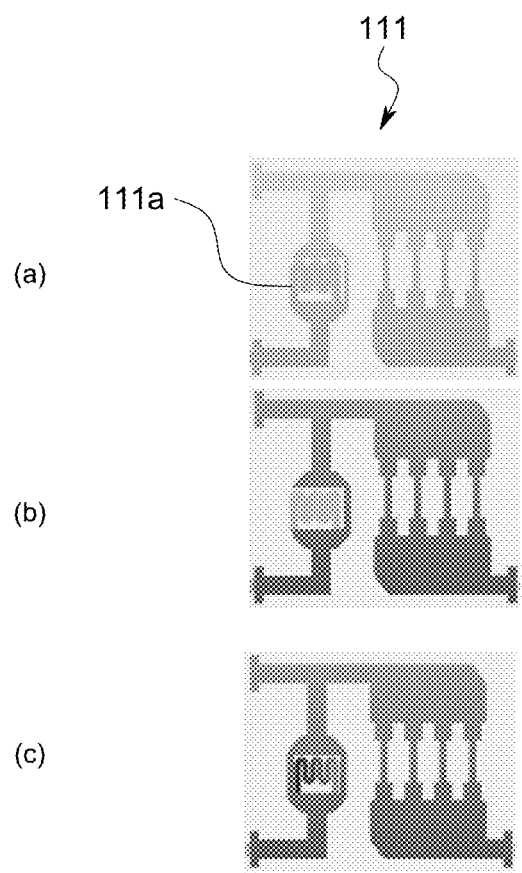
FIG. 7 is an exemplified illustration representing a change of a symbol of a constant flow rate venturi mechanism with a heat exchanger in the same embodiment.

Regarding the constant flow rate venturi mechanism with a heat exchanger, in the case where the venturi mechanism is in the inactive state, the symbol 111 thereof entirely becomes gray as shown in FIG. 7(a). In the case where the venturi mechanism is in the active state, when the heat exchanger is in the OFF state, only the heat exchanger portion 111a becomes gray and the remainder becomes blue as shown in FIG. 7(b), and when the heat exchanger is in the ON state, only the heat exchanger portion 111a becomes red and the remainder becomes blue as shown in FIG. 7(c).

Figure 8:
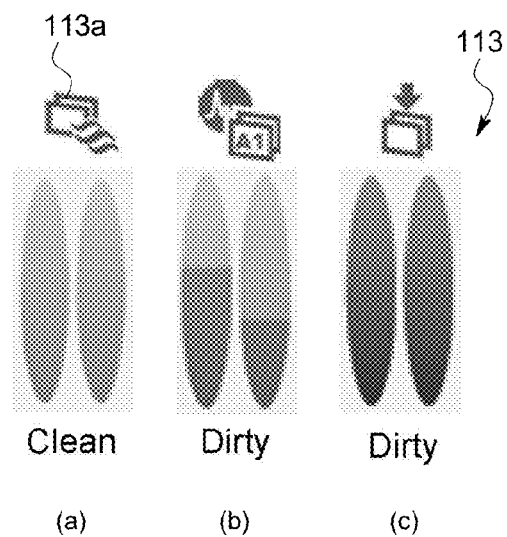
FIG. 8 is an exemplified illustration representing a change of a symbol of a sample bag in the same embodiment.

Regarding the sample bag, in the case where the exhaust gas is introduced, the symbol 113 thereof is gradually filled with blue color from the bottom thereof in accordance with the amount of the introduced exhaust gas sensed by an accompanying sensor as shown in 8(b). In the case where the amount of the introduced exhaust gas exceeds a threshold, the system status display part determines that the degree of operation safety becomes a predetermined level or lower and the symbol thereof is entirely made red as shown in FIG. 8(c), thereby notifying an operator that there may likely burst the sample bag if the exhaust gas is introduced any more.

It is noted that there are characters such as "Clean" (shown in FIG. 8(a)) showing a clean state after completion of purge and "Dirty" (shown in FIGS. 8(b) and 8(c)) showing a dirty state of purge being not finished even during introducing the exhaust gas or after introduction of the exhaust gas as an operation state, which are attached and displayed below the symbol 113 of this sample bag. Moreover there are auxiliary symbols 113a respectively showing states such as a state during introduction of exhaust gas or air, during derivation of exhaust gas or air and during purge or during analyzing, which are displayed above the symbol 113.

Figure 9:
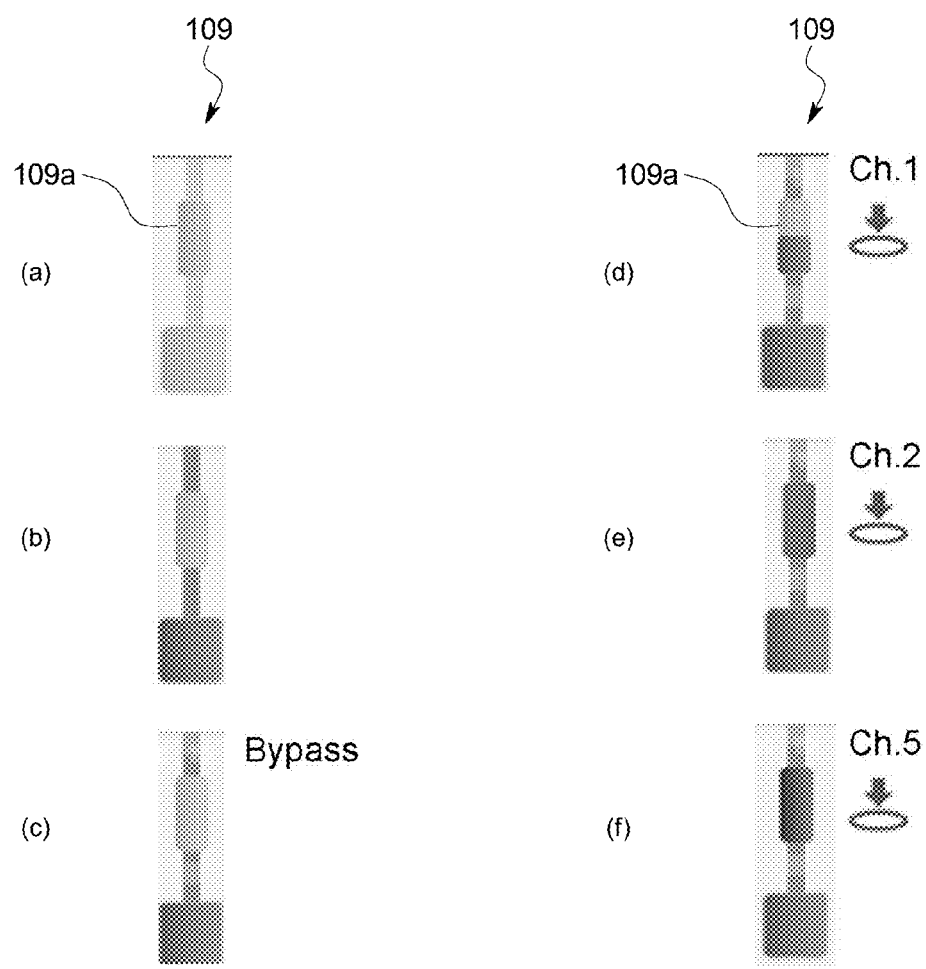
FIG. 9 is an exemplified illustration representing a change of a symbol of a PM collection filter with a pump in the same embodiment.

In the case where the PM collection filter with a pump is in the inactive state, the symbol 109 thereof becomes gray as shown in FIG. 9(a). In the case where the PM collection filter is in the active state and the pump is not operated, only a filter portion 109a in the symbol 109 becomes gray and the other becomes blue as shown in FIG. 9(b). In the case where the PM collection filter is in the active state and the pump is operated while the filter is bypassed, only the filter portion 109a becomes gray and the other becomes blue and a display "Bypass" is attached as shown in FIG. 9(c).

Thus, in the case where the PM collection filter is in the active state with the pump operating and the exhaust gas is flowing to the PM collection filter, the filter portion 109a is gradually filled with blue color from the bottom in accordance with a degree of clogging of the filter as shown in FIGS. 9(d) and 9(e). The clogging degree as an operating status is determined by measuring a pressure difference before and after the PM collection filter using the sensor. When the clogging degree reaches a predetermined threshold, the system status display part determines that the degree of operation safety becomes a predetermined level or lower and the filter portion 109a is made red as shown in FIG. 9(f), thereby notifying an operator that it is necessary to replace the filter. Here, a channel number of the selected filter is attached and displayed.

The display aspect of the corresponding symbols mainly based on the state of each test device unit is described above, but in this embodiment, it is configured that the system status display part also determines the degree of safety based on the combination operating condition of the multiple test devices.

For example, although the shut-off valve is arranged in the midway of the exhaust gas line of one route as described above, in the case where the exhaust gas line of the outstanding one route is selected in a state of the shut-off valve being closed, when the internal combustion engine is driven in this state, the exhaust gas has nowhere to go and flows back and the internal combustion engine may likely be damaged. Therefore, in the case where such a combination operating condition occurs, the system status display part determines that the degree of operation safety becomes the predetermined level or lower, the symbols respectively showing the associated test devices, i.e., the vehicle, shut-off valve and exhaust gas line connecting the exhaust pipe and the shut-off valve may be changed in color, for example, to be red and rendered to be blinking, thereby notifying the operator that the setting is erroneous.

Similarly, in the case where the exhaust gas line of the other route is selected while driving the internal combustion engine in a state that the blower is switched off, a filter for dilution gas (for removing HC) may be burnt in some cases. Therefore, in the case where such a combination operating condition occurs, the system status display part determines that the degree of operation safety becomes the predetermined level or lower, the symbols respectively showing the associated test devices, i.e., the vehicle, exhaust gas line of the other route, dilution tunnel, PM collection filter and blower may be changed in color, for example, to be red and rendered to be blinking, thereby notifying the operator that the setting is erroneous.

In the exhaust gas measurement of a diesel engine, since a correct measurement result cannot be obtained in the case where the heat exchanger remains to be switched off, also in this case, the system status display part determines that the degree of operation safety becomes a predetermined level or lower and the symbol indicating the constant flow rate venturi mechanism with a heat exchanger may be changed in color, for example, to be red and rendered to be blinking, thereby notifying the operator that the setting is erroneous.

Also, in the case where the internal combustion engine is operated in a state that the chassis dynamometer is not rotated, the system status display part determines that the degree of operation safety becomes a predetermined level or lower and the symbols indicating the internal combustion engine and chassis dynamometer may be changed in color, for example, to be red and rendered to be blinking, thereby notifying the operator that the setting is erroneous.

According to the internal combustion engine test system according to the present embodiment configured as described above, since it is possible for a user to be able to intuitively recognize an operating condition of each of the test devices of the whole test system including the information relating to safety of the operation at a glance, whereby an operation error at a time of testing the internal combustion engine can be reduced as much as possible even in a case of a complicated and large-scale test system.

In addition, the present invention should not be limited to the above embodiment. For example, the present invention may be also applied to a test in a unit of the internal combustion engine. In this case, the engine dynamometer is used instead of the chassis dynamometer and the symbol thereof in the schematic diagram 100 is merely changed.

Further, in the embodiment, although the internal combustion engine test system is applicable to both of the diesel engine and the gasoline engine with two routes of the exhaust gas line, it is also applicable to an internal combustion engine test system having only any one of the routes. In this case, it is needless to say that the schematic diagram 100 is changed.

The embodiment of such as symbols and aspects indicating the respective test devices is merely one example, and various changes may be made. The internal combustion engine is not limited to be used in a vehicle but is also applicable to an airplane and a vessel.

REFERENCE SIGNS LIST

W: Screen
100: Schematic diagram
101: Symbol of fan
102: Symbol of chassis dynamometer
103: Symbol of exhaust gas line
104: Symbol of shut-off valve
105: Symbol of dilution air purifier
106: Symbol of mixer with heater
107: Symbol of dilution air line
108: Symbol of dilution tunnel
109: Symbol of PM collection filter
111: Symbol of constant flow rate venturi mechanism with heat changer
112: Symbol of blower
113: Symbol of sample bag

What is claimed is:

1. An internal combustion engine test system equipped with a plurality of test devices including an exhaust gas line for sampling exhaust gas discharged from an internal combustion engine, the system comprising:
a system status display part adapted to display a schematic diagram of the internal combustion engine test system including a plurality of symbols each representing one of the test devices and a corresponding connecting aspect thereof on a screen; and
an operating condition acquisition part adapted to acquire data indicative of operating conditions of combinations of the test devices,
wherein the system status display part is further adapted to determine that the data indicates abnormal operating conditions for a set of the test devices and, in response to the determining, change, visual aspects of the symbols representing each of the test devices of the set, without changing an entirety of the screen, to indicate a change in degree of operation safety associated with the set of the test devices.

2. The internal combustion engine test system according to claim 1, wherein the system status display part is further adapted to determined a degree of operation safety from the data and determined which of the visual aspects to change based on the change in degree of the operation safety.

3. The internal combustion engine test system according to claim 2, wherein the visual aspects include color, brightness, pattern or shape and wherein the system status display part is further adapted to change stepwise the color, brightness, pattern or shape of the symbols representing each of the test devices of the set based on the change in degree of operation safety.

4. The internal combustion engine test system according to claim 3, wherein one of the test devices of the set is a shut-off valve provided on the exhaust gas line and wherein the system status display part is further adapted to determine the degree of operation safety from a valve opening/closing status that indicates an operating condition of the shut-off valve and an operating condition of the internal combustion engine, and change the visual aspects of the symbols representing the shut-off valve and the exhaust gas line connected thereto based on the change in degree of operation safety.

5. The internal combustion engine test system according to claim 3, wherein one of the test devices of the set is a blower for suction provided at an end of the exhaust gas line and wherein the system status display part is further adapted to determine the degree of operation safety from an on/off status that indicates an operating condition of the blower and an operating condition of the internal combustion engine, and change the visual aspects of the symbols representing the blower and the exhaust gas line connected thereto based on the change in degree of operation safety.

6. The internal combustion engine test system according to claim 1, wherein the visual aspects include color, brightness, pattern or shape.

7. The internal combustion engine test system according to claim 1, wherein the system status display part is further adapted to, in response to a determination that the data indicates circumstances in which a correct measurement result cannot be obtained from particular test devices, change visual aspects of the symbols representing each of the particular test devices, without changing an entirety of the screen, to indicate an inability to obtain correct measurement results therefrom.

8. A computer program, for an internal combustion engine test system equipped with a plurality of test devices including an exhaust gas line for sampling exhaust gas discharged from an internal combustion engine, stored on a non-transitory computer readable medium that when executed by a computer causes the computer to exert functions of:
an operating condition acquisition part adapted to acquire data indicative of an operating condition of each of the test devices; and
a system status display part adapted to display on a screen a schematic diagram of the internal combustion engine test system including a symbol representing each of the test devices and a corresponding connecting aspect thereof, wherein the system status display part is further adapted to determine that the data indicates abnormal operating conditions for a set of the test devices and, in response to the determining, change visual aspects of the symbols representing each of the test devices of the set, without changing an entirety of the screen, to indicate a change in degree of operation safety associated with the set of the test devices.

9. An internal combustion engine test system equipped with a plurality of test devices including an exhaust gas line for sampling exhaust gas discharged from an internal combustion engine and a shut-off valve provided on the exhaust gas line, the system comprising:
   a system status display part adapted to display a schematic diagram of the internal combustion engine test system including a plurality of symbols each representing one of the test devices and a corresponding connecting aspect thereof on a screen; and
   an operating condition acquisition part adapted to acquire data indicative of operating conditions of combinations of the test devices including a valve opening/closing status that indicates an operating condition of the shut-off valve,
   wherein the system status display part is further adapted to determine that the valve opening/closing status indicates an abnormal operation condition and, in response to the determining, change visual aspects of the symbol representing the shut-off valve and the exhaust gas line connected thereto to indicate a change in degree of operation safety associated with the shut-off valve.

* * * * *